United States Patent
Unterrainer et al.

(10) Patent No.: US 7,113,534 B2
(45) Date of Patent: Sep. 26, 2006

(54) DEVICE FOR GENERATING TERAHERTZ RADIATION, AND A SEMICONDUCTOR COMPONENT

(75) Inventors: Karl Unterrainer, Pfaffstatten (AT); Gottfried Strasser, Pfaffstatten (AT); Juraj Darmo, Vienna (AT); Andreas Stingl, Korneuburg (AT); Tuan Le, Vienna (AT)

(73) Assignee: Femtolasers Produktions GmbH, (AT)

( * ) Notice: Subject to any disclaimer, the term of this patent is extended or adjusted under 35 U.S.C. 154(b) by 232 days.

(21) Appl. No.: 10/505,576
(22) PCT Filed: Feb. 18, 2003
(86) PCT No.: PCT/AT03/00053

§ 371 (c)(1),
(2), (4) Date: Aug. 24, 2004

(87) PCT Pub. No.: WO03/073563

PCT Pub. Date: Sep. 4, 2003

(65) Prior Publication Data

US 2005/0121629 A1   Jun. 9, 2005

(30) Foreign Application Priority Data

Feb. 28, 2002   (AT) ................ A 312/2002

(51) Int. Cl.
*H01S 3/08* (2006.01)
*H01S 3/098* (2006.01)
*G21G 4/00* (2006.01)

(52) U.S. Cl. ............... 372/99; 372/92; 372/98; 372/102

(58) Field of Classification Search ............ 372/18, 372/99, 92, 98, 102; 250/493.1
See application file for complete search history.

(56) References Cited

U.S. PATENT DOCUMENTS 4,782,222 A * 11/1988 Ragle et al. ............ 250/214 R 5,109,203 A * 4/1992 Zucker et al. ............ 331/96

(Continued)

FOREIGN PATENT DOCUMENTS

EP   0 606 776   7/1994

(Continued)

OTHER PUBLICATIONS

Liu et al., "THz Radiation from Intracavity Saturable Bragg Reflector in Magnetic Field with Self-Started Mode-Locking by Strained Saturable Bragg Reflector", Jpn. J. Appl. Phys., vol. 38, No. 11b, pp. L1333-L1335, Nov. 15, 1999, XP002272906.

(Continued)

*Primary Examiner*—Minsun Oh Harvey
*Assistant Examiner*—Hrayr A. Sayadian
(74) *Attorney, Agent, or Firm*—Ostrolenk, Faber, Gerb & Soffen, LLP

(57) ABSTRACT

The invention relates to a device for generating terahertz (THz) radiation comprising a short pulse laser (1) with mode coupling to which a pump beam (3) is supplied, and comprising a semiconductor component equipped with a resonator mirror (M4). This semiconductor component serves to derive the THz radiation based on incident laser pulses. The resonator mirror (M4), preferably a resonator end mirror, is provided with a semiconductor layer (8), which is partially transparent to the laser radiation of the short pulse laser (1), whose absorption edge is lower than the energy of the laser radiation of the short pulse laser (1) and on which the electrodes (9, 10) that can be connected to a bias voltage source are placed in order to generate and radiate the THz radiation in the electric field.

33 Claims, 3 Drawing Sheets

U.S. PATENT DOCUMENTS

| | | | | |
|---|---|---|---|---|
| 5,146,075 A | * | 9/1992 | Kim et al. | 250/214.1 |
| 5,148,251 A | * | 9/1992 | Kim et al. | 257/458 |
| 5,153,442 A | * | 10/1992 | Bovino et al. | 250/551 |
| 5,155,352 A | * | 10/1992 | Kim et al. | 250/214.1 |
| 5,177,486 A | * | 1/1993 | Kim et al. | 342/21 |
| 5,185,586 A | * | 2/1993 | Zucker | 331/96 |
| 5,262,657 A | * | 11/1993 | Kim et al. | 257/86 |
| 5,280,168 A | * | 1/1994 | Kim et al. | 250/214.1 |
| 5,283,584 A | * | 2/1994 | Kim et al. | 342/21 |
| 5,319,218 A | * | 6/1994 | Kim et al. | 257/1 |
| 5,332,918 A | * | 7/1994 | Smith et al. | 257/431 |
| 5,382,788 A | * | 1/1995 | Kim et al. | 250/214.1 |
| 5,432,374 A | * | 7/1995 | Norton | 257/442 |
| 5,663,639 A | * | 9/1997 | Brown et al. | 324/96 |
| 5,729,017 A | * | 3/1998 | Brener et al. | 250/338.1 |
| H001717 H | * | 4/1998 | Stoudt et al. | 257/431 |
| 5,773,817 A | * | 6/1998 | Kingsley et al. | 250/214.1 |
| 5,789,750 A | * | 8/1998 | Nuss | 250/338.1 |
| 5,844,288 A | * | 12/1998 | Mourou et al. | 257/431 |
| 5,912,455 A | * | 6/1999 | Pocholle et al. | 250/214 R |
| 5,940,424 A | * | 8/1999 | Dietrich et al. | 372/49.01 |
| 6,344,829 B1 | * | 2/2002 | Lee | 343/753 |
| 6,400,165 B1 | * | 6/2002 | Knox et al. | 324/752 |
| 6,407,708 B1 | * | 6/2002 | Jasper, Jr. | 343/701 |
| 6,777,684 B1 | * | 8/2004 | Volkov et al. | 250/341.1 |
| 6,810,062 B1 | * | 10/2004 | Kuznetsov | 372/92 |
| 6,958,853 B1 | * | 10/2005 | Arnone et al. | 359/326 |
| 2004/0228371 A1 | * | 11/2004 | Kolodzey et al. | 372/5 |

OTHER PUBLICATIONS

Brown E.R., "A Photoconductive Model for Superior GaAs Thz Photomixers", Applied Physics Letters, American Institute of Physics., vol. 75, No. 6, pp. 769-771, Aug. 9, 1999, XP000877773.

Zhenlin Liu, et al., Efficient terahertz radiation generation from a bulk InAs mirror as an intracavity terahertz radiation emitter, Japanese Journal of Applied Physics., Part 2 (Letters), vol. 39, No. 4B, pp. L366-L-367, Apr. 15, 2000, XP002272907.

Nemec H., et al., "Study of carrier dynamics in LT GaAs by means of time-resolved emission terahertz spectroscopy", Conference Digest 2000 International Quantum Electronics Conference, p. 154, Sep. 10, 2000, XP010540312.

Nemec H., et al., "Carrier dynamics in low-temperature grown GaAs studied by terahertz emission spectroscopy", *Journal of Applied Physics*, vol. 90, No. 3, pp. 1303-1306, Aug. 1, 2001.

Nobuhiko Sarukura, et al., *All-Solid-State, THz Radiation Source Using a Saturable Bragg Reflector in a Femtosecond Mode-Locked Laser*, Jpn. J. Appl. Phys. vol. 36 (1997) Pt. 2, No. 5A, pp. L560-L562.

Nobuhiko Sarukura, et al., *THz-radiation Generation from an Intracavity Saturable Bragg Reflector in a Magnetic Field*, Jpn. J. Appl. Phys. vol. 37 (1998) pp. L125-L126.

Zhenlin Liu, et al., *Efficient Terahertz Radiation Generation from a Bulk InAs Mirror as an Intracavity Terahertz Radiation Emitter*, Jpn. J. Appl. Phys. vol. 39 (2000) pp. L366-L367.

Tze-An Liu, et al., *High Average Power Mode Locked Ti: Sapphire Laser with Intracavity Continuous-Wave Amplifer and Strained Saturable Bragg Reflector*, Jpn. J. Appl. Phys. vol. 38 (1999) pp. L1109-L1111.

Ch. Fattinger et al., *Terahertz Beams*, Appl. Phys. Lett. 54(6), Feb. 6, 1989, pp. 490-492.

O. Mitrofanov, et al., *Thin terahertz detectors and emitters based on low temperature grown GaAs on sapphire*, Conference on Lasers and Electro-Optics (CLEO 2000). Technical Digest. Postconference Edition. TOPS vol. 39; IEEE Cat. No. 00CH37088. Opt. Soc. America, Salem, MA, USA; May 2000; pp. 528-529.

* cited by examiner

DEVICE FOR GENERATING TERAHERTZ RADIATION, AND A SEMICONDUCTOR COMPONENT

The invention relates to a device for generating terahertz (THz) radiation comprising a short pulse laser with mode locking to which a pump beam is supplied, and a semiconductor component including a resonator mirror, which semiconductor component simultaneously is designed for deriving the THz radiation on the basis of impacting laser pulses.

Furthermore, the invention relates to a semiconductor component including a resonator mirror to be used in a laser, which resonator mirror is adapted to enable mode-locked operation of the laser, wherein the semiconductor component simultaneously is designed to generate terahertz (THz) radiation on the basis of impacting laser pulses.

Electromagnetic radiation in the terahertz range ($10^{11}$ Hertz to $10^{13}$ Hertz), i.e. in the form of continuous waves just as in the form of pulses, would be usable with great advantage e.g. in spectroscopy, but also in other fields, e.g. in future computers. Various proposals have already been made for the generation of such a terahertz radiation, as e.g. in Sarukura et al., "All-Solid State, THz Radiation Source Using a Saturable Bragg Reflector in a Femtosecond Mode-Locked Laser", Jpn. J. Appl. Phys., Vol. 36, Part 2, No. 5A, 1 May 1997, pp. L560–L562. In this article, the use of a mode-locked laser for generating short laser pulses in connection with a semiconductor mirror, a saturable Bragg reflector (SBR element), has been described which comprises a quantum well for generating terahertz radiation. The SBR element is installed within the resonator of a mode-locked laser, wherein the impact angle of the laser beam approximately corresponds to the so-called Brewster angle. In this manner, outcoupling of the terahertz radiation is possible. What is disadvantageous, however, is that each laser pulse impacts twice on the SBR element during its roundtrip in the resonator, whereby the terahertz radiation is radiated in four different directions. Thus, an efficient bundling and use of the generated radiation is not possible, and only extremely low outputs of the terahertz radiation—in the range of nW—are achieved.

In a further article by Sarukura et al., "THz-radiation Generation from an Intracavity Saturable Bragg Reflector in a Magnetic Field", Jpn. J. Appl. Phys. Vol. 37, No. 2A, 1 Feb. 1998, pp. L125–L126, a somewhat modified arrangement of a SBR element in connection with a short pulse laser with mode locking is disclosed, wherein the SBR element is used as an end mirror of the laser resonator. There, the SBR element is mounted in the field of a permanent magnet, wherein the magnetic field controls the radiation pattern of the main lobes of the terahertz radiation to thus prevent capture of the radiation within the substrate of the SBR element. With this arrangement of the SBR element as a resonator end mirror, an increase of the output of the terahertz radiation up to a value of 0.8 µW was, in fact, obtained, yet a higher output would still be desirable for practical applications, apart from the fact that the provision of a magnetic field is complex in practice.

A similar arrangement with an InAs(indium arsenide) mirror in a magnetic field is disclosed in Liu et al., "Efficient Terahertz Radiation Generation from Bulk InAs Mirror as an Intracavity Terahertz Radiation Emitter", Jpn. J. Appl. Phys. Vol. 39, Part 2, No. 4B, 15 Apr. 2000, pp. L366–L367. There, the impacting angle of the laser beam on the InAs mirror is very large, in the range of 85°. This mirror again is arranged within the laser resonator, resulting in the already previously mentioned disadvantage that each laser pulse meets the mirror twice and that thus the terahertz radiation is generated in four directions. When carrying out experiments, the average output of the terahertz radiation achieved was in the range of 5 nW, with an average laser resonator output of 4.5 W. A further disadvantage is that with the InAs mirror a separate component is additionally introduced in the laser resonator. Besides, the arrangement of an SBR element in a magnetic field is also known from the earlier article by Liu et al., "THz Radiation from Intracavity Saturable Bragg Reflector in Magnetic Field with Self-Started Mode-Locking by Strained Saturable Bragg Reflector", Jpn. J. Appl. Phys., Vol. 38, Part 2, No. 11B, 15 Nov. 1999, pp. L1333–L1335.

Furthermore, a mode-locked laser with an SBR element is described in Liu et al., "High Average Power Mode Locked Ti:Sapphire Laser with Intracavity Continuous-Wave Amplifier and Strained Saturable Bragg Reflector", Jpn. J. Appl. Phys., Vol. 38, Part 2, No. 10A, 1 Oct. 1999, pp. L1109–L1111.

From EP 606 776 A, furthermore a device for delivering terahertz radiation is known in which an superimposed arrangement of two electrodes on a substrate is provided, between which an LT-GaAs material shall be provided. With the occurrence of laser pulses, the terahertz radiation is generated in the plane of the substrate, resulting in technological disadvantages and a low robustness.

Another manner of generating terahertz radiation by using an antenna with a large aperture is described in Fattinger et al., "Terahertz beams", Appl. Phys. Lett. Vol. 54, No. 6, 6 Feb. 1989, pp. 490–492. Here, the generation of the terahertz radiation is based on a transient photocurrent obtained by optically generated charge carriers which move in an electric field between two electrodes. The semiconductor material used for the emitter typically has a high resistance, with the useful life of the charge carriers being very short. A corresponding arrangement is also described in U.S. Pat. No. 5,729,017 A. It is also known to use compounds such as GaAs (gallium arsenide) compounds, AlGaAs (aluminum-gallium-arsenide) compounds, LT-GaAs compounds and LT-AlGaAs compounds (LT—low temperature) for the semiconductor material in which the charge carriers are produced, cf. also Mitrofanov et al., "Thin terahertz detectors and emitters based on low temperature grown GaAs on sapphire", Conference on Lasers and Electro-Optics (CLEO 2000). Technical Digest. Postconference Edition. TOPS Vol. 39; IEEE Cat. No. 00CH37088. Opt. Soc. America, Salem, Mass., USA; May 2000; pp. 528–529.

The aforementioned low temperature semiconductor materials are applied at low temperatures in the order of 200° C. to 500° C., and they are characterized by short recombination times of the photo charge carriers.

In particular, here it is also known that in case of LT-GaAs material with the light-induced transient terahertz radiation a recombination time of the charge carriers of a few ps or below 1 ps is attainable.

Departing from the known investigations, it is now an object of the invention to provide a device and a semiconductor component, respectively, with which the generation of terahertz radiation by using a mode-locked short pulse laser is efficiently enabled, wherein also the output of the terahertz radiation shall be substantially higher than in the known arrangements and, preferably, shall also be controllable. In particular, for the terahertz radiation outputs in the range of mW shall be rendered possible.

The arrangement according to the invention and of the initially defined type is characterized in that the resonator mirror, preferably a resonator end mirror, is provided with a semiconductor layer which is partially permeable for the laser radiation of the short pulse laser, the absorption edge of the semiconductor layer being below the energy of the laser radiation of the short pulse laser, and electrodes connectable to a bias voltage source being mounted thereon in a manner known per se so as to generate the THz radiation in the electric field and radiate it.

Correspondingly, the inventive semiconductor component of the initially defined type is characterized in that on the resonator mirror, preferably on a resonator end mirror, a semiconductor layer partially permeable for the laser radiation is provided, the absorption edge of the semiconductor layer being below the energy of the laser radiation and electrodes connectable to a bias voltage source being mounted thereon in a manner known per se so as to generate the THz radiation in the electric field and radiate it.

Thus, the concept of the invention is generally based on combining the semiconductor resonator mirror of the short pulse laser with a semiconductor layer with electrodes which also serve as antennas for the THz radiation, and to generate the desired terahertz radiation in this semiconductor layer on the resonator mirror by means of the laser beam. In doing so, the output of the terahertz radiation can be adjusted or even modulated simply by means of the applied voltage, i.e. the applied electric field.

In mote detail, the intensity-rich laser pulse generates movable charge carriers in the semiconductor material applied on the semiconductor resonator mirror; what is important in this context is, of course, that the energy of the laser beam be high enough so as to produce the charge carriers, i.e. the energy of the laser radiation lies above the absorption edge (that is that energy level starting from which electrons are lifted into the conduction band) of the semiconductor material, which therefore has to be chosen accordingly—depending on the type of laser used, which can be done without any problems on the basis of available semiconductor material data. Due to the electric field applied, the thus generated electrons and the holes are brought out of their resting position, and depending on their charge, they will be accelerated in opposite directions. The resultant polarisation leads to a return force, whereby plasma oscillation is obtained. This results in a transient photocurrent which generates the desired terahertz radiation which, for instance, is radiated through the resonator mirror. By means of the applied voltage, the amount of the acceleration of the charge carriers and, consequently, the intensity, or the output power, respectively, of the terahertz radiation can be controlled, or adjusted, respectively. For producing the terahertz radiation, the intensity-rich optic pulses of the short pulse laser are efficiently used, similar as in the suggestions made by Sarukura et al., as explained before, yet a principle of generating the terahertz radiation different therefrom is employed, with the separate semiconductor layer on the resonator mirror, and with the generation of the movable charge carriers in this semiconductor material by means of the laser pulses, similar as described as such e.g. in the aforementioned U.S. Pat. No. 5,729,017 A.

Naturally, the semiconductor layer applied on the resonator mirror shall allow the laser radiation substantially to penetrate to the resonator mirror, wherein, however, a part of the energy of the laser radiation is used in the semiconductor layer for generating the charge carriers. On the other hand, the material of the resonator mirror, if the terahertz radiation is delivered throught the latter, must be chosen such that it will be substantially permeable for the terahertz radiation generated.

Preferably, the resonator mirror is an end mirror, and in particular, it is formed by a saturable Bragg reflector (SBR element in short) known per se. To avoid undesired saturation effects, it is advantageous if the semiconductor layer is made of a semiconductor material with short recombination time for free electrons. The material of the semiconductor layer suitably is chosen in adaptation to the material of the resonator mirror, it being suitable if the semiconductor layer is a gallium-arsenide (GaAs) layer, in particular a low temperature gallium-arsenide (LT-GaAs) layer. On the other hand, it may also be advantageously provided that the semiconductor layer is an aluminum-gallium-arsenide (Al-GaAS) layer, in particular a low temperature aluminum-gallium-arsenide (LT-AlGaAs) layer. Such semiconductor materials can be grown on a Bragg reflector which in turn is made up of layers of aluminum-gallium-arsenide (Al-GaAs)/Aluminum-arsenide (AlAs), these layers being epitaxially applied on a gallium-arsenide (GaAs) substrate. Advantageously, molecular beam epitaxy may be employed for applying the layers.

In order to bundle the generated terahertz radiation, it may furthermore be suitable if a dielectric lens, e.g. of silicon (Si), gallium-arsenide (GaAs) or the like, is mounted as a beam control element for the emitted THz radiation on the side of the resonator mirror that faces away from the electrodes.

In particular, the electrodes are designed strip-shaped and arranged in parallel to each other, having a width of from 5 μm to a few 10 μm, wherein the distance between the electrodes may be from 30 μm up to a few mm. Typically, the distance between the electrodes is larger than the diameter of the laser beam, at least the dimensions should be chosen such that the intensity center of "gravity" of the beam cross-section of the laser beam is located between the electrodes. The electrodes may me made e.g. of metal, such as gold, aluminum, chromium, platinum-gold-layer systems or titanium-gold-layer systems, yet it is also possible to form the electrodes of a doped semiconductor material, with the semiconductor material electrodes in turn being connected by metallic contacts.

With such electrodes or antenna elements for generating the terahertz radiation and the aforementioned dimensions and distances, respectively, bias voltages in the order of 150 volts and more, practically even up to 400 volts, may be applied so as to generate the electric field. The limit is given by the breakdown voltage in the semiconductor material. Preferably, the bias voltage source is adapted to deliver variable bias voltages for adjusting the intensity of the THz radiation and/or for modulating the THz radiation.

In the following, the invention will be further explained by way of preferred exemplary embodiments illustrated in the drawings to which, however, it shall not be restricted. Therein, FIG. 1 shows a diagram of a device having a short pulse laser with mode-locking and a semiconductor component used as resonator end mirror, which semiconductor component is adapted to generate terahertz radiation;

FIG. 2 schematically shows a side view of such a semiconductor component;

FIG. 3 schematically shows a top view onto this semiconductor component, wherein also the application of a bias voltage to electrodes of this semiconductor component is shown;

Figure 1:
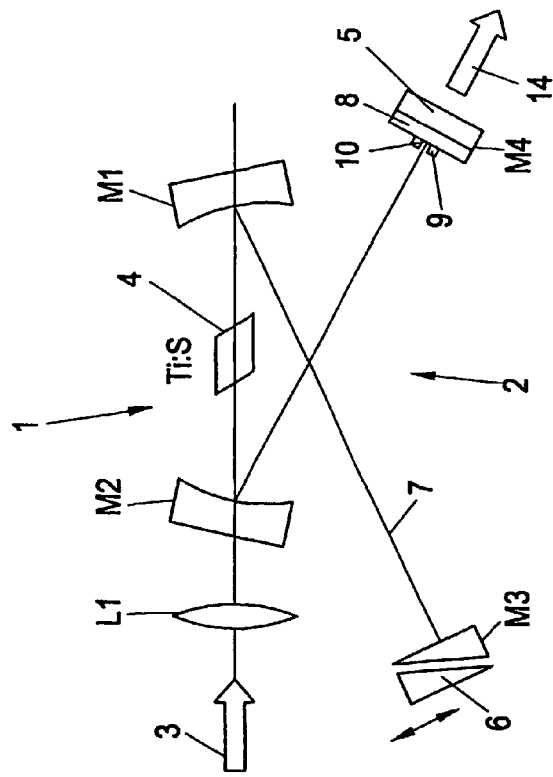

In FIG. 1, a short pulse laser 1 is schematically illustrated, in which, e.g., the per se known Kerr-lens mode locking principle is used for generating the short pulse.

According to FIG. 1, the short pulse laser 1 includes a laser resonator 2 to which a pump beam 3, e.g. an argon laser beam, is supplied. For the sake of simplicity, the pump laser (Argon laser, e.g.) itself has been omitted and belongs to the art.

After having passed a lens L1 and a dichroic mirror M2, the pump beam 3 excites a laser crystal 4, a titanium: sapphire solid laser crystal (commonly termed Ti:S in short in the literature and also in the following) in the instant example. The dichroic mirror M2 is permeable for the pump beam 3, yet highly reflective for the Ti:S laser beam. This laser beam, the resonator beam, impacts on a laser mirror M1 and is reflected by the latter to a laser mirror M3 which also serves for outcoupling. This laser mirror M3 again reflects the laser beam back to mirror M1, and from there the laser beam is reflected to laser mirror M2, passing through the laser crystal 4 a second time. From there, the laser beam then is reflected to a resonator end mirror M4 with a saturable Bragg reflector 5, termed SBR element in short hereinafter, whereby a per se common X-folded laser resonator 2 is formed. Via the outcoupling mirror M3, the laser beam is coupled out, with possible compensation means being provided, a compensation platelet 6 as well as a mirror in thin film technique not further shown providing for a dispersion compensation as well as taking care that no undesired reflections will occur in the direction of the laser resonator 2. The laser beam obtained in the manner described in the laser resonator 2 is denoted by 7 in FIG. 1.

The laser crystal 4 is a plane-parallel body which is optically non-linear and forms a Kerr element which has a greater effective optical thickness for higher field strengths of the laser beam 7, yet a slighter effective thickness if the field strength, or intensity, respectively, of the laser beam 7 is lower. This per se known Kerr effect is then used for self-focussing of the laser beam 7, i.e. the laser crystal 4 forms a focussing lens for the laser beam 7.

In the exemplary embodiment illustrated, the saturable Bragg reflector 5 is used for mode-locking in per se conventional manner.

The mirrors M1, M2 are made in per se known thin film technique, i.e. they are each designed with many layers which fulfill their function when reflecting the ultra-short laser pulse which has a large spectral bandwidth. The different wave length components of the laser beam enter to different depths into the layers of the respective mirror before being reflected. By this, the different wave length components are delayed on the respective mirror for different amounts of time; the short-wave components will be reflected rather outwardly, the long-wave components, however, will be reflected deeper within the mirror. This means that the long-wave components will be temporally delayed relative to the short-wave components. In this manner, a dispersion compensation is attained insofar as pulses of a particularly short time range (preferably in the range of 10 femtoseconds and below) have a wide frequency spectrum; this is due to the fact that the different frequency components of the laser beam in the laser crystal 4 "see" a different refraction index, i.e. the optical thickness of the laser crystal 4 is differently large for the various frequency components, and the different frequency components therefore will be differently delayed when passing through the laser crystal 4. This effect is counteracted by the above-mentioned dispersion compensation at the thin film laser mirrors M1, M2.

As described above, this is a conventional set-up of a short pulse laser with mode-locking, and a detailed description of the same therefore is not required.

What is essential for the sought generation of terahertz radiation 14 is that the resonator mirror M4 is equipped with additional means in a special way, as will be explained in more detail with reference to FIGS. 2 and 3.

In detail, the resonator mirror M4 comprises a semiconductor layer 8 as a semiconductor component on the SBR element 5 proper (cf. also FIG. 2 in addition to FIG. 1), which semiconductor layer 8 consists of a semiconductor material with a short recombination time for free electrons. On this semiconductor layer 8, two substantially strip-shaped, parallel-extending electrodes 9, 10 are applied which are connected with terminals 11 and 12, respectively (cf. FIG. 3) for applying a voltage U to the electrodes 9, 10. The distance between the strip-shaped electrodes 9, 10 is denoted by D in FIG. 3 and is chosen such that the impacting laser beam 7 with its beam cross-section 7' (cf. also FIG. 3) comes to lie substantially between the electrodes 9, 10 during operation—at least the intensity centre of gravity of the beam cross-section 7' of the laser beam 7 should lie between the electrodes 9, 10 so as to avoid unnecessary losses. This distance D may, e.g., be from 30 μm up to a few mm. The strip-shaped electrodes 9, 10, in turn may have a width B of e.g. from 5 μm up to a few 10 μm.

The SBR element 5 as mirror and saturable absorber is assembled in usual manner from a plurality of dielectric layers which, however, are not further illustrated in the drawing and which are applied to a substrate likewise not further visible in detail. The substrate may be made of a conventional material which is substantially permeable for electromagnetic radiation in the THz range, in particular $10^{11}$ Hz to $10^{13}$ Hz, and it serves as a carrier for the Bragg reflector. A conventional gallium-arsenide(GaAs) substrate with high resistance is used, e.g., which carries layers of aluminum-gallium-arsenide, or aluminum-arsenide, respectively, which are epitaxially grown on the gallium-arsenide substrate. Of course, however, also other combinations of semiconductor materials and dielectric materials are possible to build up the Bragg reflector, and also other conventional production methods (thin film techniques) may be used.

The semiconductor layer 8 forms a saturable absorber, and it consists, e.g. in the case of a Bragg reflector with aluminum-gallium-arsenide, or aluminum-arsenide layers, of a gallium-arsenide applied at low temperature, a so-called LT (low temperature) GaAs layer, which, e.g., is applied by molecular beam epitaxy (MBE) and has a saturable absorption at a wave length of, e.g., approximately 800 nm and a recombination time in the order of picoseconds. Another possible way is to use LT-AlGaAs for the semiconductor layer 8, if shorter laser wavelengths are used. The thickness of the semiconductor layer 8 is chosen with a view to the sought pulse energy, which is absorbed, wherein the function of the Bragg reflector 5 should not be deteriorated. In one concrete exemplary embodiment, an LT-GaAs layer having a thickness of 326 nm was grown as semiconductor layer 8 at 220° C. on an AlGaAs/AlAs Bragg reflector structure with a GaAs quantum well. Then the semiconductor layer 8 was heat-treated in a manner known per se at 660°

C. for 10 min, and subsequently electrodes 9, 10 of titanium-gold were applied to the upper side of the semiconductor layer 8. Alternatively, metal electrodes 9, 10 of aluminum, chromium, platinum-gold etc. could be used; the choice of the metal for the electrodes 9, 10 is not critical.

The width B of the electrodes was 10 µm, and the distance D between the electrodes was 50 µm. As a bias voltage U, a direct voltage of 150 volts was applied to the thus obtained THz emitter.

Figure 2:
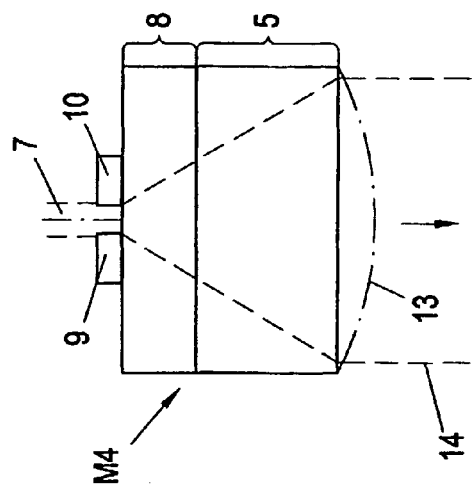

For bundling the THz radiation 14 generated and to be delivered, a collimator-beam control element in the form of a dielectric lens 13 can be applied to the rear side or outer side of the resonator mirror M4 located opposite the electrodes 9, 10 and illustrated in dot-and-dash lines in FIG. 2 (i.e. at the rear side of the substrate of the SBR element 5), this dielectric lens 13 bundling the THz radiation 14 in the desired direction. As the material for this beam control element 13, high-resistance silicon, semiinsulating gallium-arsenide or sapphire may, e.g., be used. Such a dielectric lens 13 was also present in the previously described practical exemplary embodiment.

Figure 3:
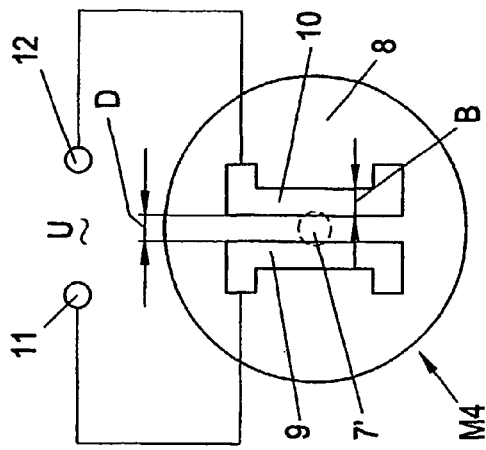

In the case of the previously described practical exemplary embodiment, the resonator mirror M4 thus formed was attached as end mirror in the laser resonator 2 of the short pulse laser with mode-locking, and the electrodes 9, 10 were connected to an external voltage supply unit not further illustrated in FIGS. 2 and 3, respectively, for applying the bias voltage U. Due to the saturable absorber (GaAs quantum well) in the laser resonator 2, a mode-locking was achieved independently of the bias voltage at electrodes 9, 10. Without a bias voltage U at the electrodes 9, 10, no measurable THz radiation could be detected, however, when applying the bias voltage U to the semiconductor layer 8 via the electrodes 9, 10, there resulted a THz radiation, the intensity of which increased with the bias voltage.

Figure 4:
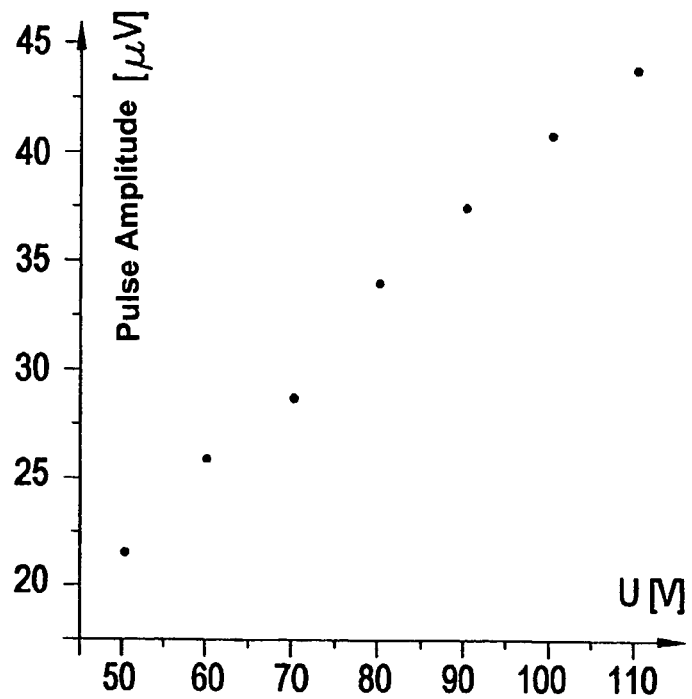
FIG. 4 shows the correlation between applied bias voltage and pulse amplitude of the generated THz radiation in a diagram.
Figure 5:
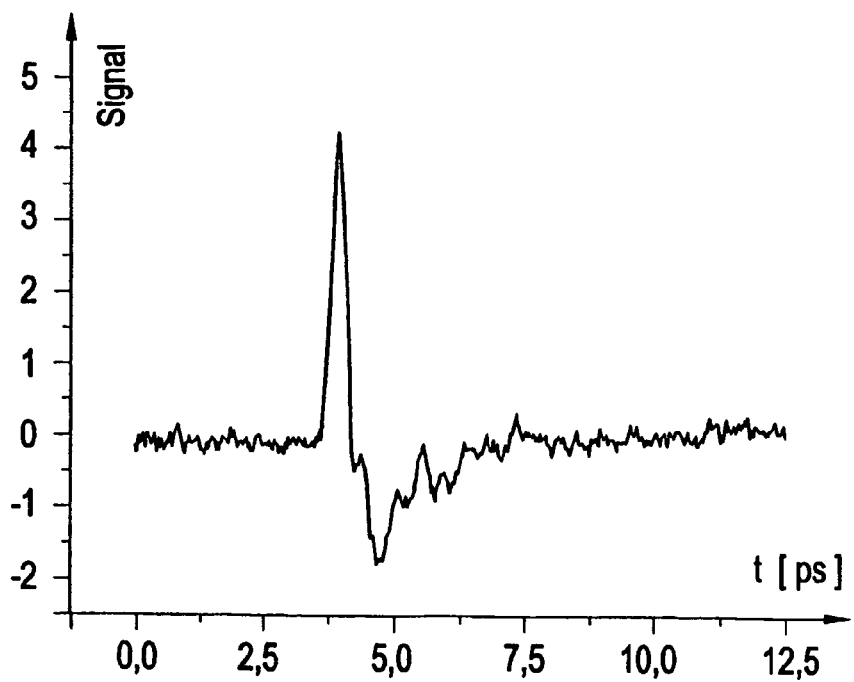
FIG. 5 shows a typical pulse of the THz radiation vs. time in a diagram.

In FIG. 4, the resultant, substantially linear correlation between the pulse amplitude of the THz radiation (in µV) and the applied bias voltage (in V) is visible. The average radiation output was measured with a calibrated silicon bolometer, wherein with the present simple test embodiment, already a value of 1.5 µW was obtained at an average resonator output of 900 mW. The typical shape of the transient THz signal which is generated in this manner in the resonator mirror M4, i.e. semiconductor component, is illustrated in FIG. 5. As can be seen, there is substantially one single narrow pulse, which means that a broadband signal is achieved. For this desired occurrence of a single pulse (instead of several decaying pulses), the short recombination time of the charge carriers in the semiconductor material is co-responsible, and this is particularly achieved in case of a low temperature application of the semiconductor layer 8.

Figure 6:
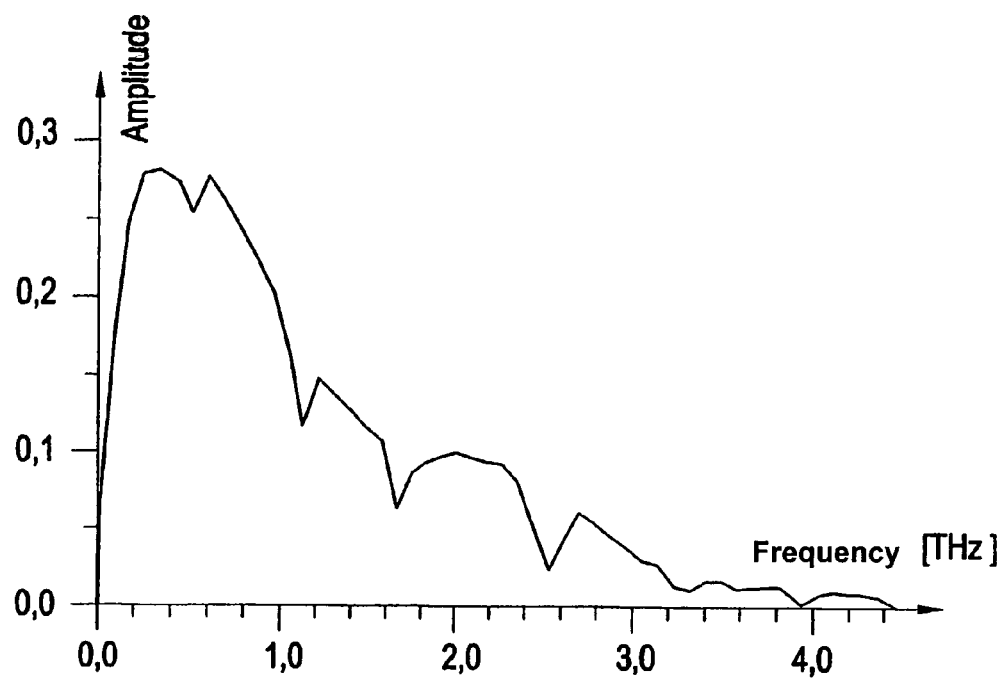
FIG. 6 shows an associated frequency spectrum of the THz radiation.

The waveshape of the THz pulse illustrated in FIG. 5 (the amplitude is shown in arbitrary units) was registered by means of an electrooptical detector. In the frequency range there results a corresponding amplitude course (again with the amplitude in arbitrary units) as shown in FIG. 6. The frequency spectrum has a maximum at approximately 0.5 THz and extends to up to approximately 2.5 THz. This THz radiation is voltage-controlled by means of the bias voltage U at the emitter electrodes 9, 10, wherein also a modulation with frequencies of up to 50 kHz (cf. the following explanations relating to FIG. 7) was tested.

The generated THz radiation 14 is indicated by an arrow and by dashed lines in FIG. 2 and by an arrow in FIG. 1.

Figure 7:
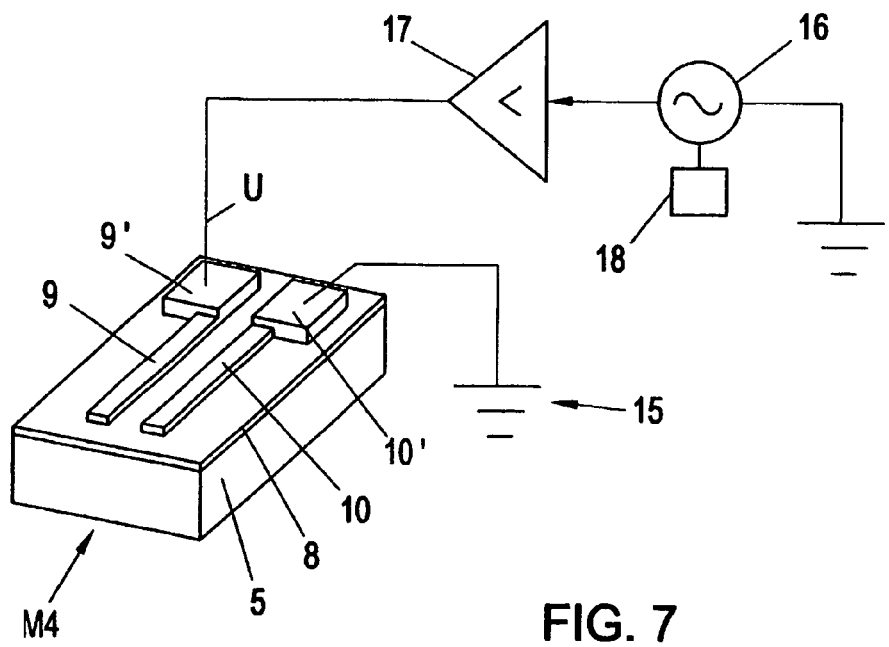
FIG. 7 shows a modified semiconductor component with associated circuit for applying an electric bias voltage in a schematic diagrammatic representation.

Instead of metallic electrodes, also electrodes 9, 10 of highly doped semiconductor material, such as, e.g., gallium-arsenide layers, are conceivable for generating the THz radiation 14. Such an embodiment will be advantageous if the beam cross-section 7' of the laser beam 7 has a larger diameter than the distance between the electrodes 9, 10, and reflections on the metallic electrodes 9, 10 would impair the laser activity. The electrodes 9, 10 then will be made e.g. in an etching process (wet etching or dry chemical etching), and externally of the impacting region of this laser beam 7, metallic contacts 9', 10' may be applied to the electrodes 9, 10 of semiconductor material, as schematically illustrated in FIG. 7 at a modified resonator end mirror M4.

The width of the strip-shaped electrodes 9, 10 may, as mentioned, quite generally be e.g. from 5 µm up to several 10 µm so as to keep low the entire resistance. The distance between the electrodes 9, 10 may be from 10 µm or several 10 µm up to several mm. Here, the limit will be determined by the desired breakdown voltage, on the one hand, and by the beam cross-section 7' of the laser beam 7 on the THz emitter, on the other hand. Mostly, the distance between the electrodes 9, 10 will be larger than the diameter of the laser beam 7.

Besides, in FIG. 7 again the embodiment of the resonator end mirror M4 with the SBR element 5 and the semiconductor layer 8 is visible. Furthermore, it is illustrated in FIG. 7 that the one electrode 10 is connected to ground 15 via the metallic contact 10', whereas the other electrode 9, via its metallic contact 9', is connected to a signal source 16 with variable frequency, with a high voltage amplifier 17 interposed. In this manner, the THz radiation generated (14 in FIGS. 1 and 2) can be controlled in its intensity according to the frequency of the bias voltage U. Of course, circuits 18 known for frequency variation and not further visible in FIG. 7 can be used in connection with the signal source, i.e. bias voltage source 16.

The invention claimed is:

1. A device for generating terahertz (THz) radiation having a short pulse laser with mode locking to which a pump beam is supplied, and a semiconductor component including a resonator-mirror, which semiconductor component simultaneously is designed for generating the THz radiation on the basis of impacting laser pulses, characterized in that the resonator mirror (M4) is provided with a semiconductor layer (8) which is partially permeable for the laser radiation of the short pulse laser (1), the absorption edge of the semiconductor layer being below the energy of the laser radiation of the short pulse laser (1), and electrodes (9, 10) connectable to a bias voltage source being mounted thereon so as to generate the THz radiation in the electric field and radiate it.

2. A device according to claim 1, characterized in that the resonator mirror (M4) is a resonator end mirror.

3. A device according to claim 1, characterized in that the resonator mirror (M4) is a saturable Bragg reflector (5).

4. A device according to claim 1, characterized in that the semiconductor layer (8) is made of a semiconductor material with short recombination time for free electrons.

5. A device according to claim 1, characterized in that the semiconductor layer (8) is a gallium-arsenide(GaAs) layer.

6. A device according to claim 5, characterized in that the semiconductor layer (8) is a low temperature gallium-arsenide (LT-GaAs) layer.

7. A device according to claim 1, characterised in that the semiconductor layer (8) is an aluminum-gallium-arsenide (AlGaAs) layer.

8. A device according to claim 7, characterised in that the semiconductor layer (8) is a low temperature aluminum-gallium-arsenide (LT-AlGaAs) layer.

9. A device according to claim 1, characterised in that a dielectric lens (13) for the emitted THz radiation is mounted on the side of the resonator mirror (M4) that faces away from the electrodes (9, 10).

10. A device according to claim 9, characterised in that the dielectric lens (13) is made of a material selected from the group consisting of silicon, gallium-arsenide (GaAs) or the like.

11. A device according to claim 1, characterised in that the strip-shaped, parallel electrodes (9, 10) are spaced at a distance (D) of from 30 µm up to a few mm from each other.

12. A device according to claim 1, characterised in that the strip-shaped electrodes (9, 10) have a width (B) of from 5 µm up to a few 10 µm.

13. A device according to claim 1, characterised in that the electrodes (9, 10) are made of metal.

14. A device according to claim 13, characterised in that the electrodes (9, 10) are made of a metal selected from the group comprising gold, aluminum, chromium, platinum-gold-or titanium-gold-layer systems.

15. A device according to claim 1, characterised in that the electrodes (9, 10) are formed by doped semiconductor material electrodes connected with metallic contacts.

16. A device according to claim 1, characterised in that at least the intensity centre of gravity of the beam cross-section (7') of the laser beam (7) is located between the electrodes (9, 10).

17. A device according to claim 1, characterised in that the bias voltage source (16) is adapted to deliver variable bias voltages.

18. A semiconductor component including a resonator mirror to be used in a laser, which resonator mirror is adapted to enable mode-locked operation of the laser, wherein the semiconductor component simultaneously is designed to generate terahertz(THz) radiation on the basis of impacting laser pulses, characterised in that on the resonator mirror (M4), a semiconductor layer (8) partially permeable for the laser radiation (7) is provided, the absorption edge of the semiconductor layer being below the energy of the laser radiation (7) and electrodes (9, 10) connectable to a bias voltage source being mounted thereon in a manner known per se so as to generate the THz radiation in the electric field and radiate it.

19. A semiconductor component according to claim 18, characterised in that the resonator mirror (M4) is a resonator end mirror.

20. A semiconductor component according to claim 18 characterised in that the resonator mirror (M4) is a saturable Bragg reflector (5) known per se.

21. A semiconductor component according to claim 18, characterised in that the semiconductor layer (8) is made of a semiconductor material with short recombination time for free electrons.

22. A semiconductor component according to claim 18, characterised in that the semiconductor layer (8) is a gallium-arsenide(GaAs) layer.

23. A semiconductor component according to claim 22, characterised in that the semiconductor layer (8) is a low temperature gallium-arsenide (LT-GaAs) layer.

24. A semiconductor component according to claim 18, characterised in that the semiconductor layer (8) is an aluminum-gallium-arsenide (AlGaAs) layer.

25. A semiconductor component according to claim 24, characterised in that the semiconductor layer (8) is a low temperature aluminum-gallium-arsenide (LT-AlGaAs) layer.

26. A semiconductor component according to claim 18, characterised in that a dielectric lens (13) e.g. made of silicon, gallium-arsenide (GaAs) or the like, for the emitted THz radiation is mounted on the side of the resonator mirror (M4) that faces away from the electrodes (9, 10).

27. A semiconductor component according to claim 26, characterised in that the dielectric lens (13) is made of a material selected from the group consisting of silicon, gallium-arsenide (GaAs) or the like.

28. A semiconductor component according to claim 18, characterised in that the strip-shaped, parallel electrodes (9, 10) are spaced at a distance of from 30 µm up to a few mm from each other.

29. A semiconductor component according to claim 18, characterised in that the strip-shaped electrodes (9, 10) have a width of from 5 µm up to a few 10 µm.

30. A semiconductor component according to claim 18, characterised in that the electrodes (9, 10) are made of metal, e.g. gold, aluminum, chromium, platinum-gold- or titanium-gold-layer systems.

31. A semiconductor component according to claim 30, characterised in that the electrodes (9, 10) are made of metal selected from the group comprising gold, aluminum, chromium, platinum-gold- or titanium-gold-layer systems.

32. A semiconductor component according to claim 18, characterised in that the electrodes (9, 10) are formed by doped semiconductor material electrodes connected by metallic contacts.

33. A semiconductor component according to claim 18, characterised in that at least the intensity centre of gravity of the beam cross-section (7') of the laser beam (7) is located between the electrodes (9, 10).

* * * * *